INVENTOR.
Ralph Spearow

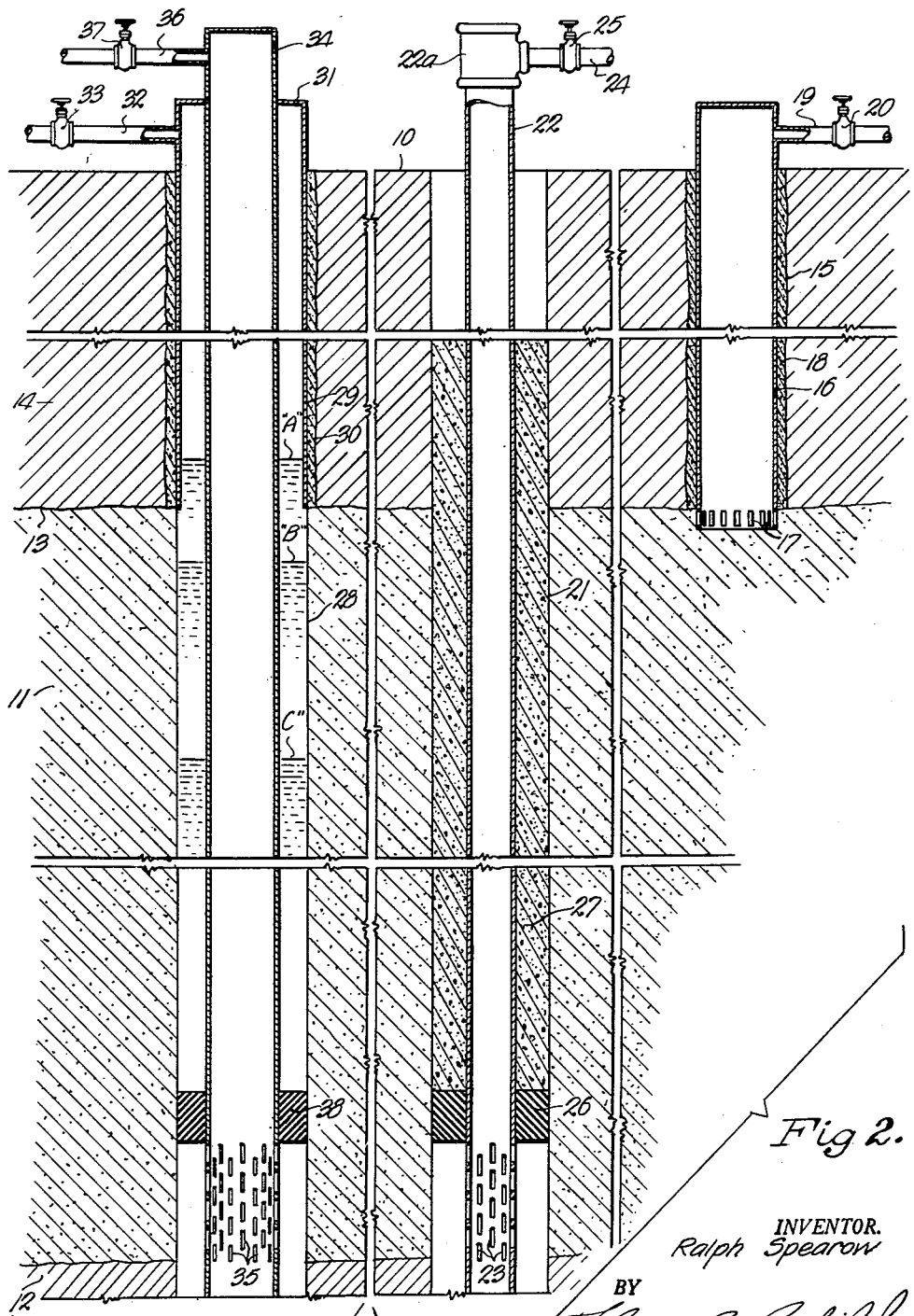

2,785,753
SINGLE PACKER OIL PRODUCTION METHOD

Ralph Spearow, Paola, Kans.

Application June 28, 1954, Serial No. 439,521

9 Claims. (Cl. 166—42)

This invention relates to methods and apparatus for producing oil from oil wells utilizing a vertical drive gaseous pressurization method and refers more particularly to separate or combined pressurization and production wells designed to produce oil by employing vertical pressurization of the oil sand fluids in the oil horizon.

This application is a continuation in part of my previous applications: Serial No. 262,568, filed December 20, 151, now Patent No. 2,725,106, and entitled "Oil Production;" Serial No. 360,645, filed June 10, 1953, entitled "Multiple Horizon Oil Production Method;" and Serial No. 363,804, filed June 24, 1953, and entitled "Movable Packer Oil Production Method." Serial No. 262,568 is in turn a continuation in part of my earlier application, Serial No. 750,396, filed May 26, 1947, and issued on April 22, 1952, as Patent No. 2,593,497.

My previous applications set forth various means, methods, and apparatus for accomplishing vertical pressurization and production of oil from oil well horizons.

The distinctive feature of my vertical gaseous pressurization oil production methods, as set forth in my previous applications and in the present application, is that gaseous pressure is applied to the top portions of the oil horizons and oil is produced from the lower portions of said horizons, the oil within the horizon being driven vertically downward by the pressurization. The pressure medium in the form of air or gas is supplied to the top portion of the oil horizon from any suitable convenient source. This pressure medium is introduced at pressures in excess of the rock pressure in the oil sand, but controlled to enter the oil sand at a rate which will cause gradual migration of the fluid oil from the upper region to the bottom of the sand. If air is used, since it does not blend with the gas and oil in the formation as well as does natural gas, it will form in a pressure pocket surrounding the well bore (input well bore) extending outwardly and downwardly therefrom causing the liquids in the sand to move ahead of it in all directions. This movement of fluids in the oil producing formation, thus begun, causes a general movement in the vicinity of the well downwardly, the pressure effect diminishing at increased radial distances from the axis from the input well. As pressures are increased, movement of the fluids in the formation will likewise increase, both with respect to the rapidity of movement and over all areas influenced.

Patent No. 2,593,497 shows a combined pressurization and production well having a pressure input area at the top portion of the oil horizon and a production area at the lower portion of the oil horizon, employing a casing extending through the oil horizon, said casing sealed to the well wall through the oil horizon and perforated in the top and bottom portions of the horizon to form the pressurization and production areas.

Serial No. 262,568 shows separate pressurization and production wells, the production well having a casing extending through the oil horizon, said casing sealed to the well wall through the oil horizon and perforated at its lower portion to form the production area.

Serial No. 360,645 illustrates, among other structures, separate pressurization and production wells, the production well having a tubing extending through the oil sand, said tubing gravel packed in its bottom portion and sealed to the well wall from the top of the gravel packed area to a level above the top of the oil horizon.

Serial No. 363,804 illustrates, among other structures, separate pressurization and production wells, the production well having a tubing extending into the oil horizon, the tubing packed off below the pressurization medium sand fluid interface, said packer being successively moved downwardly as the pressurization medium-sand fluid interface moves downwardly during the oil horizon pressurization process.

Patent No. 2,593,497 and Serial No. 262,568 illustrate methods and apparatus which, under certain circumstances, cause difficulty in the vertical pressurization oil production process. Both of these applications show production casings extending through the oil horizon and sealed thereto, the casings and their surrounding seals being perforated to permit pressurization of the upper portion of the horizon and/or production of oil from the lower portion of the horizon. One of the main problems when such a sealed casing is employed is to provide a uniform tenacious bond between the sealing material and oil sand throughout the entire oil horizon well bore face. If such is not achieved, it is possible for the pressurization medium to leak down the face of the seal and thus circumvent the usual gas cap formation. Additionally, in the perforation or shooting of the casing and its surrounding annular sealing column, trouble is often encountered, especially if the proper type of sealing material is not employed, in channeling of the sealing column under the impact of the shooting process.

In application Serial No. 363,804, in the apparatus which employs a sealed casing as in 262,568, the same sealing and channeling difficulties may be encountered. Additionally, where a single packer is employed in an oil horizon positioned on a tubing, the packer sealing said tubing to the well bore face, there is often difficulty in by-passing by fluid or pressure medium of the seal between the packer and the well wall face, particularly should the vertical permeability be low in any particular section of the well bore face. Additionally, often a packer of large cross-sectional area must be employed and it is sometimes difficult to successfully seal such a packer across its entire face to the well wall. Furthermore, in the latter case, it is difficult and tedious to keep moving the packer setting downwardly in the hole bore as the pressurization medium-sand fluid interface migrates downwardly in the pressurization process.

In the application Serial No. 360,645, complete sealing of the entire oil horizon well bore face is shown save the small oil production area at the bottom of the oil sand. This complete sealing process is often too expensive to be desirable. Additionally, Serial No. 360,645 is limited to the situation wherein the well bore has a shot cavern in the vicinity of the oil horizon and gravel packing is employed.

Therefore, an object of the present invention is to provide apparatus which effectively seals the bore hole of a combined pressurization-production well or production well from the pressurization medium-sand fluid interface to the oil production zone in a vertical pressurization oil production method without (a) running a casing to the bottom of the bore hole of the well, sealing the casing from the bottom of the bore hole to a level above the oil horizon, and perforating the casing and its surrounding seal, or (b) sealing a tubing extending to the lower portion of the oil horizon from the vicinity of the bottom of the horizon to a level above the oil horizon.

A further object of the present invention is to provide a method of producing oil from oil wells by a vertical pressurization method, employing an open well bore below the top of the sand, a tubing extending into the oil horizon with a single packer sealing said tubing to the well wall face, wherein it is not necessary to keep moving the packer downwardly as the pressurization medium-sand fluid interface drops downwardly during the oil pressurization process.

Another object of the present invention is to provide a method of producing oil from oil wells by a vertical pressurization method employing an open well bore below the top of the oil horizon, a tubing positioned in the oil sand having a single packer sealing said tubing to the well wall face wherein it is not necessary to keep the packer moving downwardly as the pressurization medium-sand fluid interface recedes downwardly in the horizon and wherein the oil pressurization area progressively increases as the interface lowers within the horizon.

Another object of the present invention is to provide a method of producing oil from oil wells by separate pressurization and production wells wherein the production well bore hole does not have a shot cavern therein and there is no need for gravel packing, wherein the lower portion of the oil horizon is merely packed off and an annular column of sealing substance against the well wall face is established above the packer.

Other and further objects will appear in the course of the following description.

In the accompanying drawings which form a part of the instant specification and are to be read in conjunction therewith, and in which like reference numerals indicate like parts in the various views, there is shown combined and separate pressurization and production wells embodying the invention.

Fig. 1 is a cross-sectional view of an earth formation in an oil field showing a well comprising the preferred modification of applicant's invention which is used both for pressurization and production.

Fig. 2 is a cross-sectional view through the same earth formation as is shown in Fig. 1 in an oil field showing two wells, the left well in Fig. 2 being used only for production and the right well in Fig. 2 being used only for pressurization.

Figure 3:
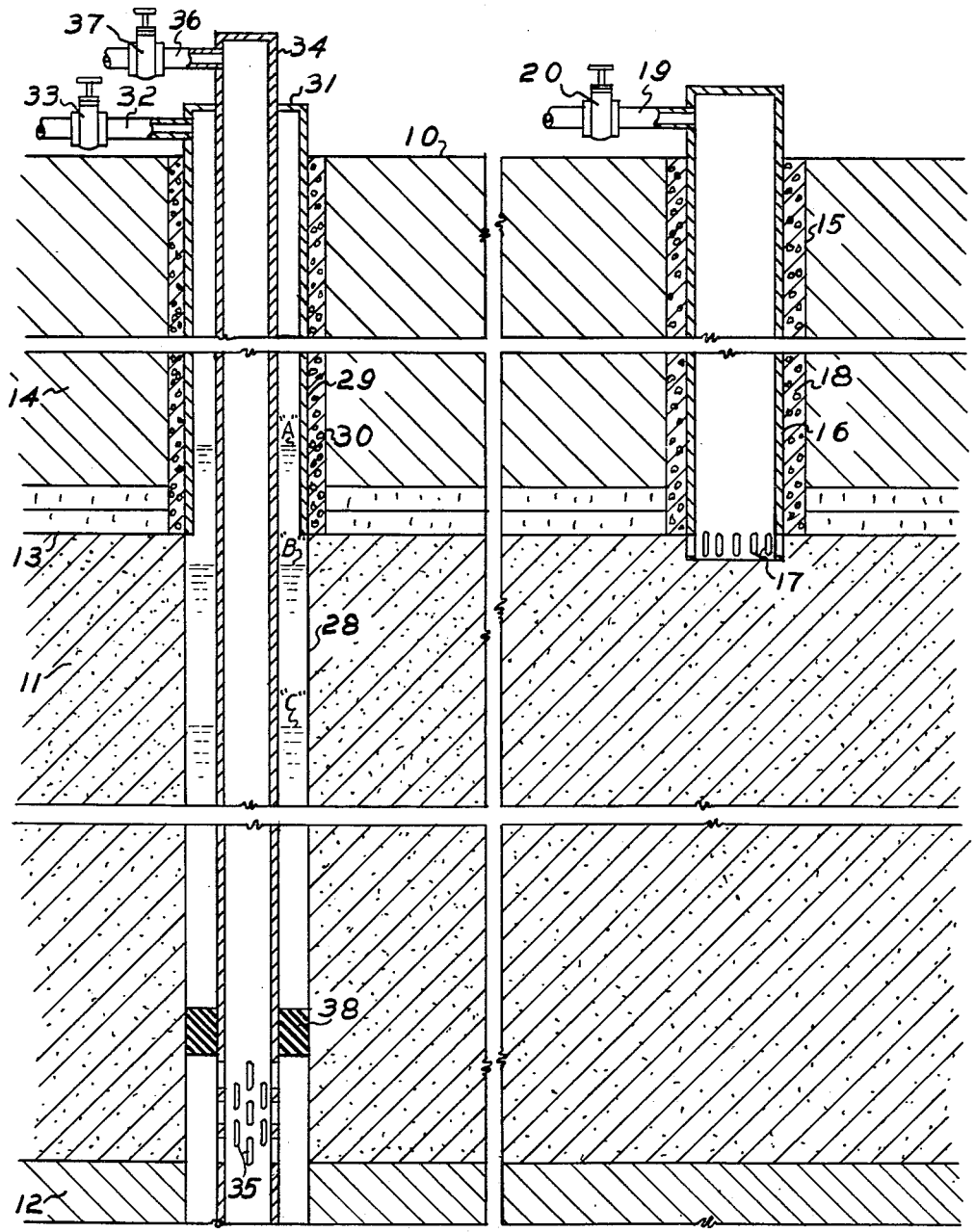
Fig. 3 is a cross-sectional view of an earth formation in an oil field showing two wells, the well on the left being used only for production and the well on the right being used only for pressurization, the two wells being used in conjunction one with the other.

In the drawings, the ground level is indicated by numeral 10. Oil sand or horizon 11 has relatively impervious black sand layer 12 at the bottom thereof and relatively impervious layers 13 at the top thereof with overlying formations and over burden 14.

At the right in Figure 2 is shown a pressurization well having a bore hole 15 which extends into the top portion of horizon 11. Pressurization casing 16 extends into the top of horizon 11 and has perforations 17 at its lower end. Pressurization casing 16 is sealed to the bore hole 15 by an annular column 18 of sealing material (asphaltic or resinous) or cement which extends from the top of the oil horizon to any desired level above the oil horizon. The pressurization seal is of such strength as to retain within the top of the oil horizon any pressures which may be applied to the horizon through the pressurization casing 16. Pressurization casing 16 has pressure input line 19 and valve 20 thereon, the input line being attached to any conventional source of gaseous pressure (not shown).

The center well in Fig. 2 illustrates a production well having bore hole 21 which extends to the vicinity of the bottom of the oil horizon. Production tubing 22 having conventional T 22a on the upper end thereof extends from the surface of the ground to the vicinity of the bottom of the oil horizon and has perforations 23 in the lower portion thereof. T 22a permits either flowing or pumping of the fluids which enter tubing 22 through perforations 23. Attached to the sealed upper end of tubing 22 is flowline 24 having valve 25 therein. Tubing 22 is sealed to the well wall of the oil horizon just above the bottom of the oil horizon and above the perforations 23. This seal is accomplished by conventional packer 26. A column of sealing material 27 extends from the top of packer 26 to a level above the top of oil horizon 11. The sealing column 27 and packer 26 are sealed to the well wall with such strength as to prevent any leakage of pressure medium along the well wall at the operating pressures of the oil production pressurization method.

The well in Fig. 1 is employed as a combination pressure and production well. This well has a bore hole 28 drilled to the vicinity of the bottom of oil sand 11. Primary casing 29 extends from the surface 10 to the top of the oil horizon 11. Casing 29 is sealed to the wall of the surrounding formations by an annular column of sealing substance 30 which extends from the top of the oil horizon to a level above the top of the oil horizon. Such sealing column is of sufficient strength as to prevent any leakage of pressure medium into the overlying formations at the operating pressures of the oil pressurization process. Casing 29 has sealed bradenhead 31 with pressure flowline 32 attached thereto having valve 33 therein. Pressure line 32 is attached to any conventional pressurization source (not shown). Production tubing 34 extends to the vicinity of the bottom of oil horizon 11 and is sealed at its upper extremity to bradenhead 31. Tubing 34 has perforations 35 at the lower end thereof. Production flowline 36 having valve 37 is attached to the sealed head of tubing 34. Tubing 34 is sealed to the oil horizon well wall at a level immediately above the bottom of the hole bore, oil horizon and perforations 35. This seal is accomplished by conventional packer 38 which vertically seals off the annulus between the tubing 34 and the well wall or hole bore 28. The seal between packer 38 and the well wall is of such strength as to prevent by-passing under the pressures employed in the oil production method. The packer 38 is also of sufficient width to readily establish sufficient sealing surface. "A" indicates a first level of fluid in the annulus between tubing 34 and well wall 28 in the operation of the inventive method, "B" indicates a succeeding operative level of fluid in the said annulus and "C" indicates a further succeeding level of fluid to fluid level "B" in the annulus in the operation of the inventive method. These levels will be further explained in the following description of the method.

The operation of the inventive method will be described separately with relation to the various figures. As the well at the left contains the preferred form of apparatus and the preferred inventive method is employed herein, the method as operated in this well will be described first.

Referring now to the well illustrated at the left in the Figure 1, it should be pointed out that this well, employing the apparatus shown therein, can be operated either as a combined pressurization and production well or, in conjunction with another pressurization well such as the example shown in Fig. 3, as solely a production well. These two functions will be separately described and the operation as a combined pressurization and production well will be described first.

With the well completed as set forth in the previous description and as shown in Figure 1, a petroleum crude fluid of equal or higher viscosity than the liquid hydrocarbons contained in the natural oil reservoir will preferably be poured into the annulus between the tubing 34 and well wall 28 so that the upper surface of said fluid will stand in the annulus to a level above the top of the oil horizon such as that indicated at level "A." In selecting the fluid just mentioned, it is recommended that the fluid be slightly higher in viscosity and slightly lower in gravity than the fluid resident in the earth oil reservoir into which the well described is drilled. A sufficiently weathered sample of oil from the same reservoir will suffice for the foregoing stated purpose. It is contemplated that many other fluids, including but not limited to water and oil of various viscosities and gravities, may be employed but the foregoing fluid is preferred.

Having filled the annulus to the level designated as "A," pressure is then applied through flowline 32 to casing 29 in sufficiently high degree to force the fluid placed in the annulus to enter the oil reservoir at points above the pressure tight seal 38. As this fluid is forced into the reservoir, the upper level of the fluid in the annulus will gradually drop until it comes to the level designated as "B." As the top of the fluid column passes the casing shoe of casing 29 in the oil reservoir, the compressed gas or air being used to force the fluid column into the oil reservoir will immediately find a means of escape directly into the reservoir. This escape will, of course, retard the downward movement of the upper surface face of the fluid column. The oil horizon is naturally more permeable to the gaseous pressure medium than to the fluid in the fluid column. While the downward movement of the upper face of the fluid column will be retarded, it will not stop until enough of the sand face of the hole bore has been exposed to take all of the compressed air or gas which is being injected into the well, at which time the downward movement of the fluid column will cease. This level is designated as level "B." It should be noted that as the pressurization continues, the gaseous pressure medium will continue to force its way into the oil horizon and form a gas cap by the separation of the gas loaded top of the formation and the oil bearing portion of the formation. This segregation results in the formation of a pressurization medium-fluid or gas-oil interface within the horizon, which, as the gas cap expands and increases in volume, moves gradually downwardy through the horizon. While the pressurization is going on at the top of the formation, oil is withdrawn from the lower portion of the formation through perforations 35 and tubing 34 below packer 38. As the pressurization continues, the interface constantly, though gradually, moves downwardly through the horizon. The level of the top of the fluid column in the annulus will coincide essentially at all times with the level of this gas-oil interface within the horizon. Thus, it should be noted that, effectively, a complete seal is created within the well bore from the top of the annulus column of fluid to the bottom of packer 38 during the pressurization process. As the gas-oil interface migrates gradually downwardly in the horizon, so also will the top surface of the annulus column of fluid migrate downwardly. This progression is indicated in the drawings by level "C" and is followed as above stated until the gas-oil interface in the reservoir reaches a level adjacent the bottom of packer 38. When the gas-oil interface in the reservoir has moved to this point parallel to the base of the sealing device 38 and the topmost portions of the perforations 35, this well will have lost its purpose and function as an oil producer but may still be utilized as a pressure injection unit. This latter assumption is on the basis that other wells in the oil horizon controlled by the operator of this well may be positioned where the base of the sealing device therein is closer to sea level or rather closer to the earth center than is the case in this particular well. Therefore, production would continue from those wells which are located at the lowest point or points in the reservoir.

Should it be desired to operate a well similar to the well in the Figure 1 as a production unit only, such well may be employed in conjunction with a pressurization well such as is shown in the Figure 3. To this purpose, the annulus between the tubing 34 and the well wall is again filled with fluid, as previously described, in sufficient volume so that the upper surface of said fluid will stand in the annulus to a level above the top of the oil reservoir such as that indicated as level "A." Pressure in the form of gas or air is then applied to the top portion of the oil horizon through the pressurization well 16 through pressure input line 19. Again, a gas cap and gas oil or pressure medium-sand fluid interface are formed as previously described as the pressurization continues. As the pressurization process affects the sand fluids, oil may be produced from tubing 34 through perforations 35. Valve 33 is kept closed during the pressurization process. When the gas cap reaches the bore hole 28 of the production well, the gas immediately rises through the fluid to the volume above the level "A" and exerts pressure downwardly on the fluid column in the annulus. The top of the fluid column is then gradually forced, during the pressurization process, downwardly until it coincides with the level of the gas-oil interface in the oil horizon. The level of the top of the fluid column then migrates gradually downwardly as the gas-oil interface migrates downwardly, as previously described in the description of the operation of the well as a combined pressurization and production well. This downward progression continues until the gas-oil interface again passes below the lower edge of packer 38 when, again, the production well becomes useless as a production unit. Should there be any leakage pas packer 38 of fluid during pressurization, more may be added thereabove.

The method as employed in a combination pressurization and production well as in Fig. 1 may be summarized as comprising the following steps: (1) drilling the bore hole of an oil well to the vicinity of the bottom of an oil horizon, (2) running a primary casing having a pressure flowline thereon to the top of the oil horizon, (3) sealing said primary casing to the surrounding formations from the top of the oil horizon to a level above the top of the oil horizon to effect a pressure-tight seal above said horizon, (4) running a tubing perforated at its lower end and sealed to the primary casing above the surface to the vicinity of the bottom of the hole bore and oil horizon, (5) sealing said tubing to the well wall in the vicinity of the bottom of the oil horizon, (6) filling the annulus between the well wall and the tubing with fluid to a level above the top of the oil horizon, (7) applying pressure to the top of the fluid column in the annulus whereby the top of the column is forced below the top of the oil horizon, (8) continuously applying pressure to the top of the column and well bore face, and (9) producing oil through the tubing below the tubing-well wall seal. Oil may be pumped from the tubing should the oil sand or oil horizon pressure be insufficient to flow the oil to the surface.

The method as applied in separate pressurization and production wells having apparatus as shown in Figure 3 may be summarized in the following steps: (1) drilling the bore hole of an oil well to the vicinity of the bottom of an oil horizon, (2) running a primary casing to the top of the oil horizon, (3) sealing said primary casing to the surrounding formations from the top of the oil horizons to a level above the top of the oil horizons to effect a pressure-tight seal above said horizon, (4) running a tubing perforated at its lower end and sealed to the primary casing above the surface to the vicinity of the bottom of the hole bore, (5) sealing said tubing to the well wall in the vicinity of the bottom of the oil horizon employing a pressure-tight packer, (6) filling the annulus between the well wall and tubing with fluid to a level above the top of the oil horizon, (7) drilling a pressurization well into the top of the oil horizon, (8) running a pressurization casing having a pressurization flowline thereto into the top of the oil horizon, (9) sealing the pressurization casing from the top of the oil horizon to a level above the top of the oil horizon so as to effect a pressure-tight seal above said oil horizon, (10) applying gaseous pressure to the top of the oil horizon through the pressurization casing whereby an expanding gas cap is formed within said horizon and (11) producing oil through the tubing below the tubing-well wall seal. In this instance also, oil may be pumped from the tubing if the horizon pressure is insufficient to flow the oil to the surface. A plurality of both pressurization and production wells may be employed if desired.

The center well in Figure 1 is a production well designed to be employed with another pressurization well preferably of the type shown to the right in Figure 1 or, if desired, with the well shown to the left of Figure 1 when the latter is employed both as a pressurization and production well. The alternative form of the inventive method, as shown in this modification, may be described in the following steps: (1) drilling the bore hole of an oil well to the vicinity of the bottom of an oil horizon, (2) running a production tubing having perforations in the lower end thereof to the vicinity of the bottom of the hole bore, (3) sealing the production tubing to the well wall in the vicinity of the bottom of the oil horizon with a pressure-tight packer, (4) filling the annulus between the well wall and the tubing above the upper surface of said packer with a column of sealing material or cement to a level above the top of the oil horizon so as to form a pressure-tight seal between the sealing column and the well wall from a level above the top of the oil horizon to the bottom surface of the packer, (5) applying gaseous pressure to the top portion of the oil horizon through a separate pressurization well whereby a gas cap is formed in the horizon and (6) producing oil from the tubing below the tubing-well wall seal. Oil may be pumped from the tubing should the formation pressure under the pressurization process be insufficient to flow the oil to the surface. As the formation is pressurized from an external pressurization well, such as either the wells on the left or the right in the single figure, a gas-oil interface is formed within the horizon, as previously described, which migrates gradually downwardly in the formation as the pressurization process continues. When the gas cap reaches the well wall of the production well, due to the complete seal between the well wall and sealing column, there is no vertical leakage upwardly or downwardly along the face of the hole bore. Therefore, there is no intercommunication between the pressurization zone in the upper portion of the formation and the production zones in the lower portion of the formation until the gas-oil interface passes the lower edge of the packer. When this latter event occurs the production well becomes useless as a producer.

Once pressurization of an horizon has proceeded to successful production from the horizon, it is feasible to intermittently shut down the compressors and continue to produce oil by the agency of "sealed in" pressures for long time intervals. This performance is, of course, feasible only when the pressurization and production wells are sealed properly as delineated above. All casing seals in both pressure and production wells must be of sufficient strength to secure whatever pressures are employed in driving the fluid and gaseous hydrocarbons downwardly through the sand body and must offer no means of escape for these pressures except at the points designated at the base of the oil sand. Additionally, it is very important that the cement or sealing material in the annular sealing column of the center well bond with the oil saturated wall of the oil horizon and thus prevent any marginal migration of the pressure agent or sand fluid downward between it and the oil sand once the pressurization agent comes in contact, as it must, with the sealed well bore.

It should be pointed out that this method will successfully produce oil from the "black sand" portion of oil horizons possessing such. Previous methods have invariably completed above this level due to its impermeability and lack of productivity. Therefore, in the drawings, the production wells have been shown completed through this layer.

This application is not based on theory but is supported by actual performance, this date, in actual wells now producing oil employing the inventive method and apparatus. The wells are completed exactly as shown in the single figure in a section of an oil field in eastern Kansas.

From the foregoing it will be seen that this invention is one well adapted to attain all of the ends and objects hereinabove set forth together with other advantages which are obvious and which are inherent to the method.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense

Having thus described my invention, I claim:

1. A method of producing oil from oil wells comprising the steps of drilling the borehole of an oil well to the vicinity of the bottom of an oil horizon, running a primary casing having a pressure flow line thereon to the top of the oil horizon, sealing said primary casing to the surrounding formations from the top of the oil horizon to a level above said oil horizon with a seal of such strength and extent as to confine within the oil formation such pressures as may be applied to the top of the horizon in the oil production method, running a tubing having inlet means at the lower end thereof sealed to the primary casing above the surface of the ground to the vicinity of the bottom of the hole bore, sealing said tubing to the well wall in the vicinity of and above the bottom of the oil horizon and above the lower end of the tubing with a seal of such strength and extent as to prevent leakage along the face thereof under such pressures as may be employed in the production method, filling the annulus between the well wall and the tubing above the seal with a liquid which will penetrate the horizon on application of the operating pressures of the method thereto to a level above the top of the oil horizon, applying gaseous pressure to the top of the liquid column in the annulus through said pressure flow line whereby the top of the column is forced below the top of the oil horizon and at least some of the liquid is forced out into the oil horizon, continuing to apply gaseous pressure to the top of the liquid column and oil horizon through said pressure flow line whereby to force the pressurization medium into the upper portion of the oil horizon and move the oil therein downwardly in the horizon into the inlet means of the tubing, and producing oil through the tubing below the tubing-well wall seal.

2. A method as in claim 1 wherein oil is pumped from the tubing.

3. A method of producing oil from oil wells comprising the steps of drilling the borehole of a production oil well to the vicinity of the bottom of an oil horizon, running a primary casing sealed at its upper end to the top of the oil horizon, sealing said primary casing to the surrounding formations from the top of the oil horizon to a level above the top of the oil horizon with a seal of such strength and extent as to confine within the oil formation such pressures as may be applied to the top of the oil horizon during the operation of the method, running a tubing having inlet means at the lower end thereof and sealed to the casing above the surface, to the vicinity of the bottom of the hole bore, sealing said tubing to the well wall in the vicinity of and above the bottom of the oil horizon and lower end of the tubing with a seal of such strength and extent as to prevent leakage across the face thereof at the pressures employed in the production method, filling the annulus between the well wall and the tubing above the seal with a liquid which will penetrate the oil horizon on application of the operating pressures of the method thereto to a level above the top of the oil horizon, drilling a separate pressurization well into the top of the oil horizon, running a pressurization casing having a pressurization flow line thereto at least to the top of the oil horizon, sealing said pressurization casing from the top of the oil horizon to a level above the top of the oil horizon with a seal of such strength and extent as to confine within the oil formation such pressures as may be encountered during the operation of the production method, applying gaseous pressure to the top of the oil horizon through the pressurization casing whereby an expanding gas cap is formed in the top of the oil horizon which upon migration to the borehole of the production well forces the top of the liquid column therein below the top of the oil horizon and at least some of the liquid in the annulus into the oil horizon, continuing to apply gaseous pressure to the top of the oil horizon through the pressurization casing whereby to force the pressurization medium into the upper portion of the oil horizon and move the oil therein downwardly in the horizon into the inlet means of the tubing, and producing oil from the tubing below the tubing-well wall seal.

4. A method as in claim 3 wherein oil is pumped from the tubing.

5. A method as in claim 3 wherein gaseous pressure is applied to the top of the oil horizon from a plurality of pressurization wells.

6. A method of producing oil from oil wells comprising the steps of drilling the borehole of a production oil well to the vicinity of the bottom of an oil horizon, running a primary casing to the top of the oil horizon, sealing said primary casing to the surrounding formations from the top of the oil horizon to a level above the top of the oil horizon with a seal of such strength and extent as to contain within the horizon any pressures which may be applied thereto in the operation of the production method, running a tubing sealed to the casing above the surface and having inlet means in its lower end to the vicinity of the bottom of the hole bore, sealing said tubing to the well wall in the vicinity of and above the bottom of the oil horizon and tubing lower end with a seal of such strength and extent as to prevent pressure leakage across its face under the pressures applied to the oil horizon during the operation of the production method, filling the annulus between the well wall and the tubing above the seal with a liquid which will penetrate the oil horizon on application of the operating pressures of the method thereto to a level above the top of the oil horizon, applying gaseous pressure to the top of the oil horizon whereby to force the top of the liquid column in the production well borehole below the top of the oil horizon and at least some of the liquid in the annulus into the oil horizon, continuing to apply gaseous pressure to the top of the oil horizon to force the pressurization medium into the upper portion of the oil horizon and move the oil therein downwardly in the horizon into the inlet means of the tubing, and producing oil through the tubing below the tubing-well wall seal.

7. A method as in claim 6 wherein the liquid employed to fill the annulus between the well wall and the tubing is of a viscosity and gravity essentially the same as the liquid already resident in the oil formation and will penetrate the oil horizon on application of the operating pressures of the method thereto.

8. A method as in claim 6 wherein the liquid employed to fill the annulus between the well wall and the tubing is greater in viscosity and lower in gravity than the liquid resident in the oil horizon and will penetrate the oil horizon on application of the operating pressures of the method thereto.

9. A method as in claim 6 wherein the liquid employed to fill the annulus between the well wall and the tubing is a hydrocarbon which will penetrate the oil horizon on application of the operating pressures of the method thereto.

References Cited in the file of this patent

UNITED STATES PATENTS

| | | |
|---|---|---|
| 1,252,557 | Dunn | Jan. 8, 1918 |
| 1,457,479 | Wolcott | June 5, 1923 |
| 1,816,260 | Lee | July 28, 1931 |
| 2,044,657 | Young | June 16, 1936 |
| 2,377,529 | Stephenson | June 5, 1945 |
| 2,593,497 | Spearow | Apr. 22, 1952 |
| 2,725,106 | Spearow | Nov. 29, 1955 |